US006756728B2

(12) United States Patent
Swank et al.

(10) Patent No.: US 6,756,728 B2
(45) Date of Patent: Jun. 29, 2004

(54) TENSION BAND WITH TENSION ADJUSTING FEATURES

(75) Inventors: Harry Robert Swank, Lancaster, PA (US); Doreen May Fulmer, Lancaster, PA (US)

(73) Assignee: Thomson Licensing S. A., Boulogne Cedex (FR)

( * ) Notice: Subject to any disclaimer, the term of this patent is extended or adjusted under 35 U.S.C. 154(b) by 43 days.

(21) Appl. No.: 09/904,785

(22) Filed: Jul. 13, 2001

(65) Prior Publication Data

US 2003/0011295 A1 Jan. 16, 2003

(51) Int. Cl.[7] ..................... H04N 5/65

(52) U.S. Cl. ................ 313/477 R; 348/822; 220/2.3 A; 220/2.1 A

(58) Field of Search ................ 313/482, 477 R, 313/479, 402; 220/2.3 A, 2.1 A; 348/822, 821

(56) References Cited

U.S. PATENT DOCUMENTS 4,222,075 A 9/1980 Mitchell et al. ............ 358/246
4,356,515 A * 10/1982 Sumiyoshi et al. ......... 348/822
4,360,837 A 11/1982 Kreidler et al. ............ 358/246
5,053,880 A 10/1991 Swank ....................... 358/245
5,055,934 A * 10/1991 Swank ....................... 348/822
5,241,394 A * 8/1993 Mutso et al. ............... 348/822
5,536,996 A 7/1996 Vijlbrief ..................... 313/477

* cited by examiner

*Primary Examiner*—Nimeshkumar D. Patel
*Assistant Examiner*—Karabi Guharay
(74) *Attorney, Agent, or Firm*—Joseph S. Tripoli; Joseph J. Laks; Carlos M. Herrera

(57) ABSTRACT

The present invention provides an implosion prevention tension band 16 for use in a cathode ray tube (CRT) 10. The CRT includes a faceplate panel 18 with a substantially flat viewing faceplate 21 and a peripheral rearwardly extending sidewall 22 having an inside blend radius 23 from the viewing faceplate 21 to the sidewall 22. The tension band 16 is a single layer band surrounding the panel 18 and having a predetermined width extending rearwardly from near the faceplate 21 to at least half the distance between the rear edge of the inside blend radius 23 and the rear edge of the sidewall 22. According to another aspect of the present invention, the tension band 16 includes a plurality of tension adjusting features 40 being positioned at locations around the band 16 aft of the inside blend radius 23 in such manner that the stresses in predetermined areas of the panel 18 are reduced.

12 Claims, 4 Drawing Sheets

FIG. 1
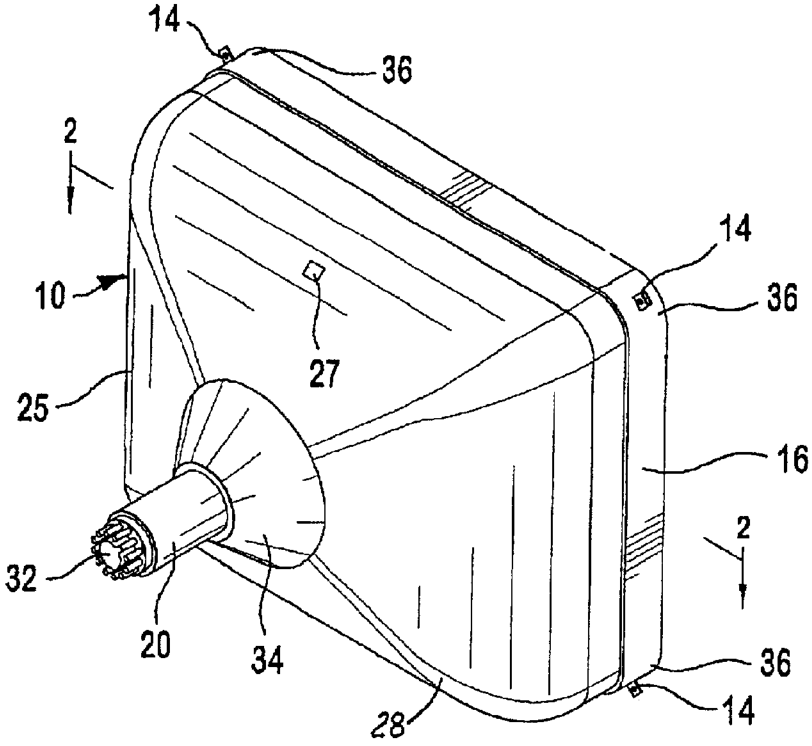
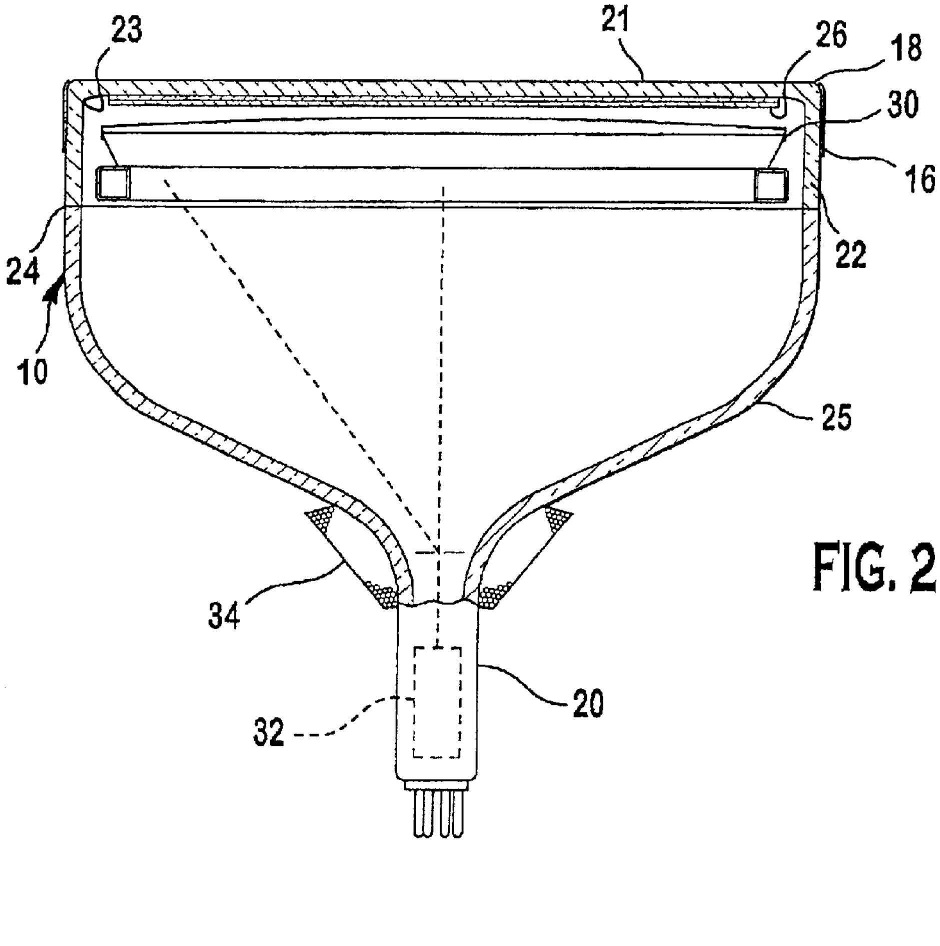
FIG. 2

FIG. 3
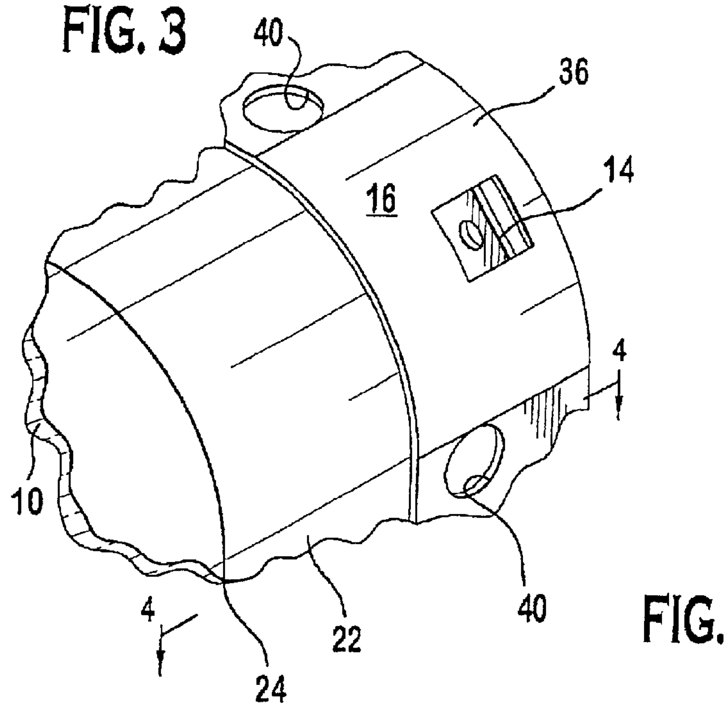
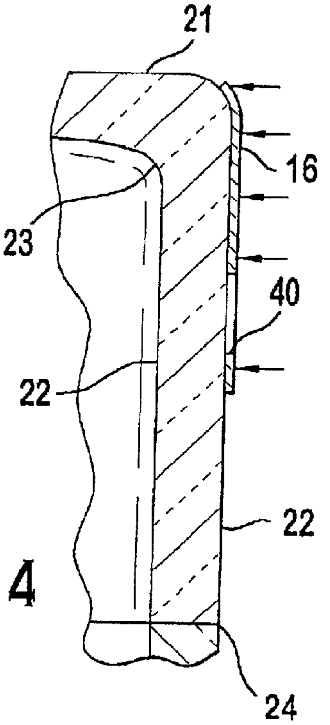
FIG. 4
FIG. 5
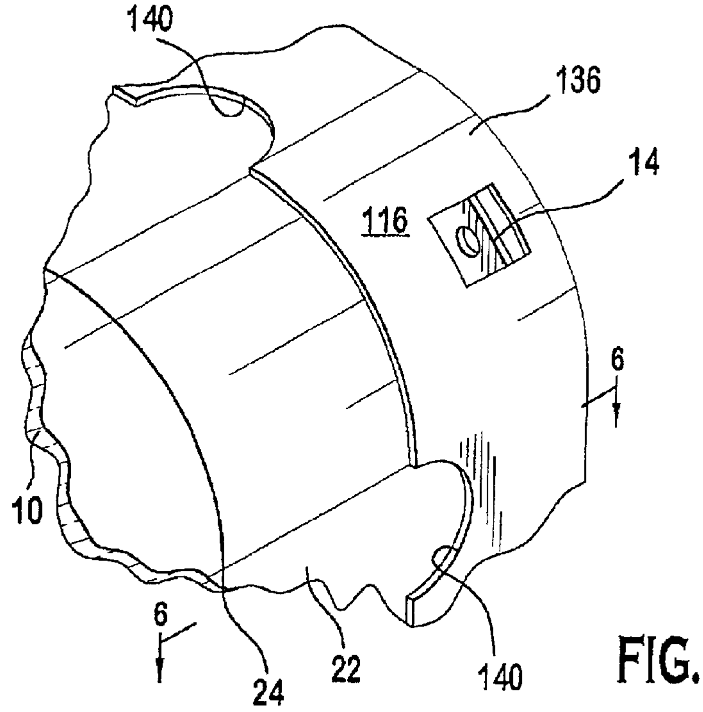
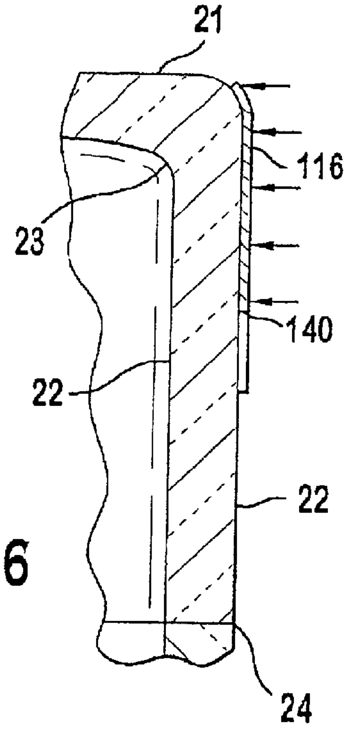
FIG. 6

FIG. 7
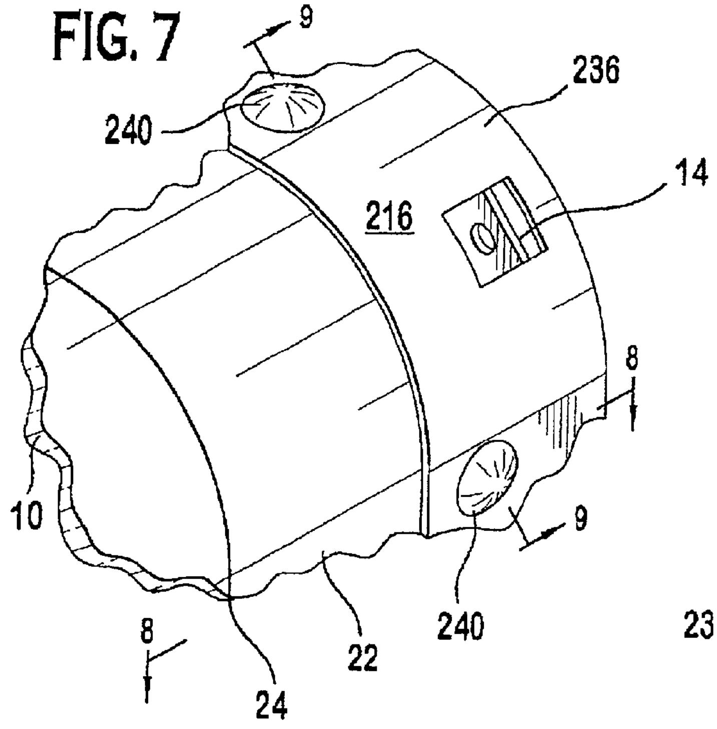
FIG. 8
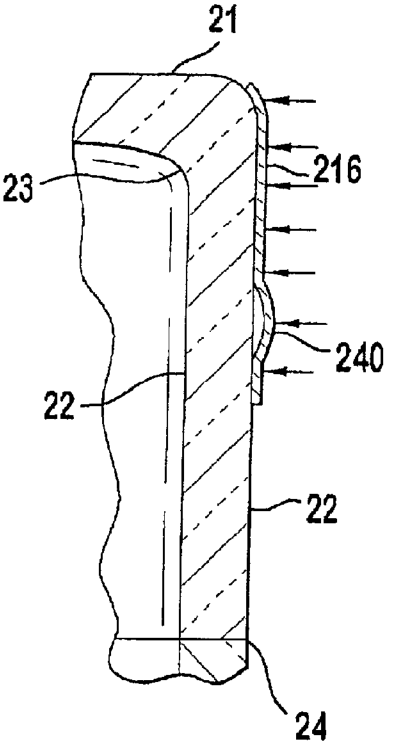
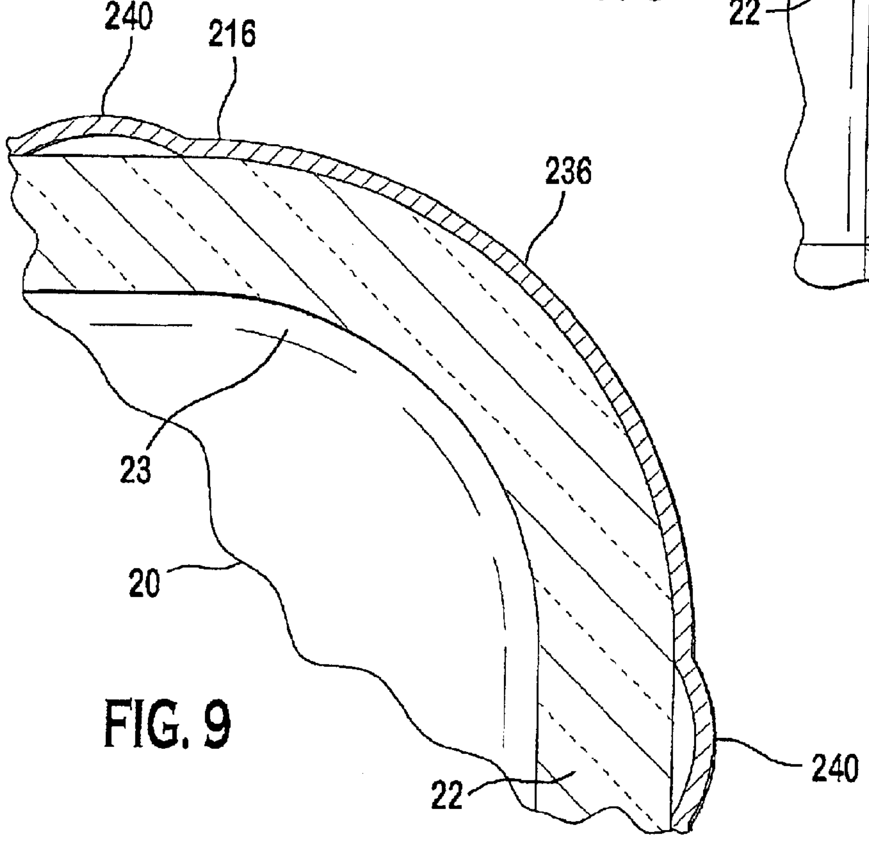
FIG. 9

FIG. 10
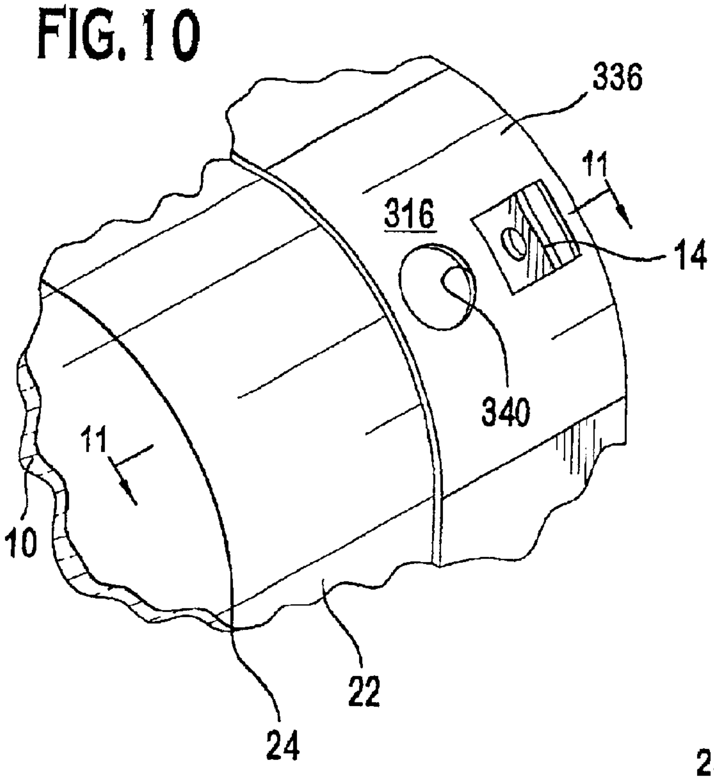
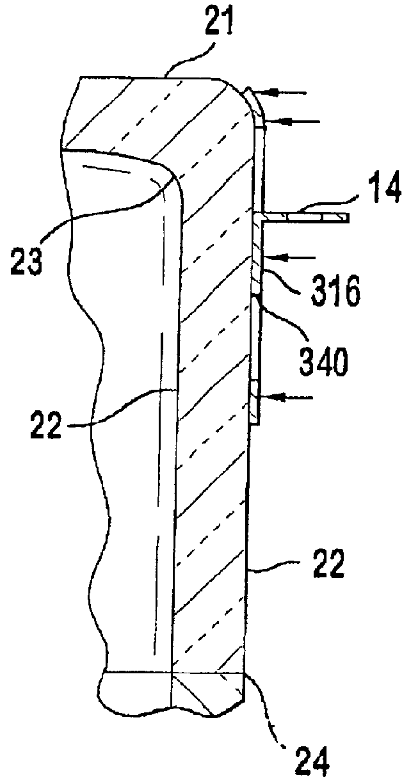
FIG. 11

TENSION BAND WITH TENSION ADJUSTING FEATURES

FIELD OF THE INVENTION

The present invention relates to an implosion prevention band, and particularly to a tension band wherein the width and tension adjusting features of the band are designed to optimize the compressive forces on the faceplate panel of a CRT.

BACKGROUND OF THE INVENTION

A conventional color CRT includes a radiused glass faceplate panel having a sidewall sealed to a funnel along a planar sealing interface known as a frit seal line. The CRT is evacuated to a very low pressure causing the tube to deform mechanically with resulting stresses produced by the vacuum and by the atmospheric pressure acting on all surfaces of the CRT. Accordingly, such stresses subject the tube to the possibility of implosion as a result of an impact to the glass faceplate panel. Such impact to the glass faceplate panel can cause the panel to shatter into many fragments, projecting the glass fragments in random directions with considerable force.

The most common solution to the implosion problem is to use convexly radiused faceplate panels with increased glass thickness near the edges of the faceplate panel to resist the stresses described above. In conjunction with the curved faceplate panel, it is also known to use an implosion prevention band consisting of a metal tension band around and tightly against the faceplate sidewalls of the CRT so as to exert a radial compressive force to the sidewalls of the faceplate panel. As tension in the implosion protection band is increased, the compressive force on the sidewall also increases causing the faceplate to dome outward in the direction of the viewing surface.

The curvature of the faceplate panel allows for the vacuum forces within the tube to be distributed through the faceplate panel. However, deformation of the tube also introduces tensile stresses throughout the faceplate panel and sidewalls. The tension bands are also used to apply a compressive force to the sidewalls of the CRT to redistribute some of the faceplate panel forces. The redistribution of the faceplate forces decreases the probability of an implosion of the tube by minimizing tensile forces in the sidewalls and corners of the faceplate panel. Implosion prevention bands are also beneficial because they improve the impact resistance of the tube because glass in compression is stronger than glass which is not in compression. Additionally, in the event of an implosion the redistributed stresses cause the imploding glass to be directed toward the back of the cabinet in which the tube is mounted, thereby substantially containing the glass fragments of the imploding tube.

An industry trend is moving towards flatter, less radiused viewing surfaces on the faceplate panel. Unfortunately, the implosion protection techniques that have been used successfully with curved faceplate panel tubes, as described above, have proven inadequate when used with these CRTs having reduced curvature or completely flat faceplate panels. Because of their geometry, the stresses on these flat panels differ from traditional radiused tubes in many ways. For example, high tensile stress areas tend to reside on the surface of the sidewalls. These stress areas continue across the frit seal and into the funnel. Glass defects in these areas become crack sources and result in unacceptable implosion characteristics for the CRT.

Conventional folded tension band systems having an inner overlapping portion of metal folded upon itself along the forward edge of the band have been proposed. However, these bands are difficult to manufacture, and the use of these bands results in a high manufacturing cost. Moreover, tubes using these types of bands having flat faceplate panels, such as in wide screen televisions using a 16:9 aspect ratio, instead of the commoner tubes having the 4:3 aspect ratio, will be subject to additional pressure exerted on the glass along the straight edge of the sidewall with the use of such bands due to the elongated sides of the panel.

SUMMARY OF THE INVENTION

The present invention provides a CRT having a substantially flat faceplate panel fastened with an implosion prevention tension band which comprises a single layer band unit surrounding the panel and extending from near the viewing faceplate of the panel to at least half the distance between the rear edge of the inside blend radius and the rear edge of the sidewall of the CRT panel. According to another aspect of the present invention, the tension band includes a plurality of tension adjusting features being positioned at locations around the band aft of the inside blend radius.

BRIEF DESCRIPTION OF THE DRAWINGS

The invention will now be described by way of example with reference to the accompanying Figures of which:

FIG. 1 shows a perspective view of a CRT having an implosion prevention tension band.

FIG. 2 is a cross sectional view of the CRT taken along the line 2—2 of FIG. 1.

FIG. 3 is a partial perspective view of a corner of a second alternate implosion prevention tension band applied on a CRT.

FIG. 4 is a cross sectional view taken along the line 4—4 of FIG. 3.

FIG. 5 is a partial perspective view of a corner of a third alternate implosion prevention tension band applied on a CRT.

FIG. 6 is a cross sectional view taken along the line 6—6 of FIG. 5

FIG. 7 is a partial perspective view of a corner of a fourth alternate implosion prevention tension band applied on a CRT.

FIG. 8 is a cross sectional view taken along the line 8—8 of FIG. 7

FIG. 9 is a cross sectional view taken along the line 9—9 of FIG. 7.

FIG. 10 is a partial perspective view of a corner of a fifth alternate implosion prevention tension band applied on a CRT.

FIG. 11 is a cross sectional view taken along the line 11—11 of FIG. 10.

DETAILED DESCRIPTION OF THE INVENTION

As best shown in FIGS. 1 and 2, a CRT 10 is surrounded by an implosion prevention tension band 16 having a plurality of mounting lugs 14 usually positioned in the corners 36. The CRT 10 consists of an evacuated envelope 28 including a faceplate panel 18 connected to a tubular neck 20 by a funnel 25. The funnel 25 has an internal conductive coating (not shown) that extends from an anode button 27 toward the faceplate panel 18. The faceplate panel 18 comprises a substantially flat viewing faceplate 21 extending through a blend radius 23 to a peripheral flange or sidewall 22. The sidewall 22 is sealed to the funnel 25 by a glass frit 24. A three-color phosphor screen 26 is applied to the inner surface of the viewing faceplate 21. The screen 26 is a lined screen with the phosphor lines arranged in triads, each of the triads including a phosphor line of each of the three colors. A color selection tension mask assembly 30 is mounted in predetermined space relation to the screen 26. An electron gun 32 shown schematically by dashed lines in FIG. 2, is centrally mounted within the neck 20 to generate and direct three inline electron beams, a center beam and two side or outer beams, along convergent paths through the tension mask assembly 30 to the screen 26. An external magnetic deflection yoke 34 positioned in the neighborhood of the funnel to neck junction subjects the three beams to magnetic fields causing them to scan horizontally and vertically in a rectangular raster over the screen 26.

The tension band 16 will now be described in greater detail. Referring first to FIGS. 1 and 2, the tension band 16 consists of a singular thickness metal strip which surrounds the sidewalls 22 of the CRT 10. Two ends of the tension band 16 are preferably joined using mechanical self-rivets to form a closed loop. Alternatively, the ends may be overlap welded, seam welded, or joined by other suitable means. As best shown in FIG. 2, the tension band 16 circumscribes and overlays the sidewall 22 and extends rearwardly from near the viewing faceplate 21 then over the blend radius 23 toward the rear edge of the sidewall 22 near the frit 24. It is preferred that the tension band 16 extend from near the viewing faceplate 21 back to a location at least half the distance between the rear edge of the blend radius 23 and the rear edge of the sidewall 22. It should be understood however, that the tension band 16 may extend back further and cover more sidewall area.

In a second embodiment, shown in FIGS. 3 and 4, the front section of the tension band 16 toward the viewing surface 21 is solid while the rear section of the tension band 16 aft of the blend radius 23 has a plurality of tension adjusting features 40. These tension adjusting features 40 are preferably circular apertures extending through the tension band 16 and positioned at locations near the corners 36 of the tension band 16 on either sides of the mounting lugs 14. The mounting lugs 14 are each fixed at the corners 36. Each mounting lug 14 has an aperture for receiving a fastener from the bezel (not shown).

The position of the tension adjusting features 40 act to detension the corners of the faceplate panel 18 because most of the tension applied by the tension band 16 is applied at the corners. The locations of the tension adjusting features 40 also provides the means of having greater tensile forces applied toward the front of the sidewall 22 by the tension band 16 thereby applying more tension to the viewing faceplate 21 while applying less tensile force aft of the blend radius 23 on the sidewalls 22 toward the frit 24. The tension adjusting features 40 relieve some of the tensile forces on the sidewall 22 aft of the blend radius 23 to avoid excessive inward deflection of the sidewall 22. Referring to FIG. 4, tensile forces applied to the sidewalls 22 and viewing faceplate 21 are shown by the arrows. The greater number of arrows toward the viewing faceplate 21 illustrate greater tensile force than the smaller number of arrows in the vicinity of the frit 24 indicating smaller tensile force applied aft of the blend radius 23.

Another embodiment of the tension band 116 is shown in FIGS. 5 and 6. For simplification, just the corner 136 is shown in FIGS. 5 and 6 because the remainder of the band is the same as the previous embodiment. The tension adjusting features 140 have been modified here to be semi-circular apertures extending through the tension band 116. The tension adjusting features 140 extend forward from a rear edge of the tension band 116 near the corners 136 along opposite sides of the mounting lug 14. The distribution of the resultant tensile forces on the viewing faceplate 21 are similarly shown in FIG. 6 by the arrows.

Yet another alternate embodiment of the present invention is shown in FIGS. 7–9. This alternate tension band 216 has tension adjusting features 240 which are formed dimples as shown best in FIGS. 7 and 9 along the rear section of the tension band 216 near the corners 236 on opposite sides of the mounting lugs 14. The dimples are similarly formed in a rear portion of the tension band 216 to apply a greater tensile force in to the viewing faceplate 21 while the remainder of the tension band 216 applies a smaller tensile force to the sidewall 22 aft of the blend radius 23. The tensile forces are similarly indicated in FIG. 8 by arrows to show a greater tension being applied toward the front of the sidewall 22.

Yet another alternate embodiment of the tension band 316 is shown in FIGS. 10 and 11. Once again, for simplification, just the corner 336 is shown in FIGS. 10 and 11 because the remainder of the band 316 is same as the previous embodiments. The tension adjusting feature 340 is shown as circular apertures and has been modified here to lay on or near the centerline of the corners 336. The resultant tensile forces are similarly greater on the viewing faceplate 21 as shown in FIG. 11 by the arrows.

The foregoing illustrates some of the possibilities for practicing the invention. Many other embodiments are possible within the scope and spirit of the invention. For example the detensioning features may be varied in size, number, shape and/or location to achieve tensioning or detensioning of the implosion protection tension band in desired areas of the CRT. Also, detensioning features of the various embodiments may be combined to achieve greater tensioning/detensioning effects. It is, therefore, intended that the foregoing description be regarded as illustrative rather than limiting, and that the scope of the invention is given by the appended claims together with their full range of equivalents.

What is claimed is:

1. An implosion prevention tension band for a cathode ray tube having an evacuated envelope including a faceplate panel at a front with a substantially flat viewing faceplate extending to a peripheral rearwardly extending sidewall and forming an inside blend radius from the viewing faceplate to said sidewall, said sidewall having corners with a given radius of curvature, said tension band comprising:

- a band surrounding said faceplate panel and having a width extending rearwardly from near said viewing faceplate at the front to at least half the distance between a rear edge of said inside blend radius and a rear edge of said sidewall; and,
- a plurality of tension adjusting features fanned in a rear section of said tension band located opposite the front and aft of said inside blend radius.

2. The implosion prevention tension band of claim 1 wherein said plurality of tension adjusting features comprises at least one aperture extending through said tension band.

3. The implosion prevention tension band of claim 2 wherein said plurality of tension adjusting features are positioned at locations near said corners of said tension band.

4. The implosion prevention tension band of claim 1 wherein said plurality of tension adjusting features comprises semi-circular apertures extending through said tension band and forward from a rear edge of said tension band toward said inside blend radius.

5. The implosion prevention tension band of claim 1 wherein said plurality of tension adjusting features comprises a dimple formed in said tension band.

6. The implosion prevention tension band of claim 1 further comprising mounting lugs fixed at said corners wherein said plurality of tension adjusting features are located near said corner of said tension band on opposite sides of said mounting lugs.

7. A cathode ray tube having an evacuated envelope including a faceplate panel with a substantially flat viewing faceplate extending to a peripheral rearwardly extending sidewall and forming an inside blend radius from the viewing faceplate to said sidewall, said sidewall having corners with a given radius of curvature, and an implosion prevention tension band having mounting lugs fixed to said faceplate panel by a surface of said tension band, said tension band comprising:

a single layer band surrounding said faceplate panel and having a width extending rearwardly from near said viewing faceplate to at least half the distance between a rear edge of said inside blend radius and a rear edge of said sidewall, and;

a plurality of tension adjusting features formed in a rear section of said tension band located aft of said inside blend radius and at a position apart from said mounting lugs.

8. The cathode ray tube of claim 7 wherein said plurality of tension adjusting features are positioned at locations near said corners of said tension band.

9. The cathode ray tube of claim 7 wherein said plurality of tension adjusting features comprises semi-circular apertures extending through said tension band and forward from a rear edge of said tension band toward said inside blend radius.

10. The cathode ray tube of claim 7 wherein said plurality of tension adjusting features comprises a dimple formed in said tension band.

11. The cathode ray tube of claim 7 wherein said mounting lugs are fixed at said corners and said plurality of tension adjusting features are located near said corner of said tension band on opposite sides of said mounting lugs.

12. The cathode ray tube of claim 7 wherein said plurality of tension adjusting features comprises at least one aperture extending through said tension band.

* * * * *